United States Patent [19]
Imamura

[11] 3,762,275
[45] Oct. 2, 1973

[54] SUPPORTING DEVICE IN A ROTARY TABLE FOR A MACHINE TOOL

[75] Inventor: Yoshiaki Imamura, Hiroshima-ken, Japan

[73] Assignee: Mitsubishi Jukogyo Kabushiki Kaisha, Tokyo, Japan

[22] Filed: Mar. 10, 1972

[21] Appl. No.: 233,690

[30] Foreign Application Priority Data
Dec. 29, 1970 Japan.............................. 45/121019

[52] U.S. Cl.................. 90/58 C, 90/58 R, 108/139, 248/349, 308/3 R, 408/234
[51] Int. Cl............................................. B23c 1/14
[58] Field of Search ................ 90/58 C, 58 R, 56 R; 408/234; 308/3 A, 3 R, 6 R; 51/240 T; 248/349; 108/139

[56] References Cited
UNITED STATES PATENTS
3,592,102  7/1971  Berthiez.......................... 90/58 R X Primary Examiner—Gil Weidenfeld
Attorney—John J. McGlew et al.

[57] ABSTRACT

A supporting device for a rotary table for a machine tool comprises support members disposed on a foundation on the opposite sides of a bed member in parallel to the direction of rectilinear feed of a table body for supporting the table body by the intermediary of hydraulic jack means provided at the opposite ends along the lengthwise direction of the table body; the supporting device further comprises bridge bed members disposed between respective support members and the bed member in parallel to the support members, and a pair of table body supporting bridge members having their respective leg portions slidably supported by the bridge bed members so as to be bridged over the bed member, the pair of table body supporting bridge members are constructed so as to be movable together with the table body along the bridge bed members.

4 Claims, 7 Drawing Figures

PATENTED OCT 2 1973 3,762,275

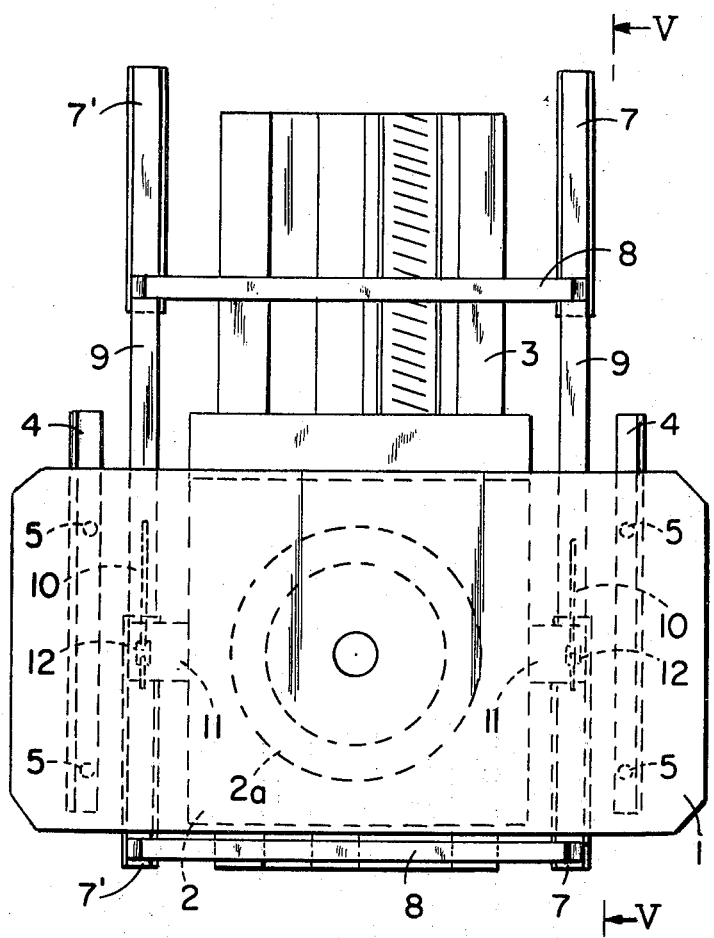
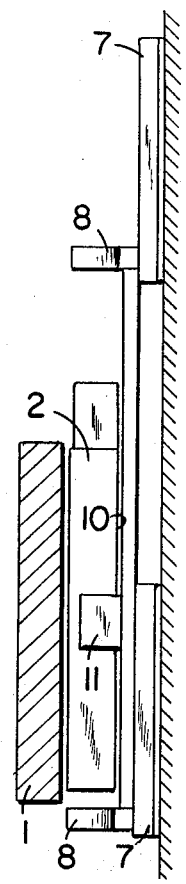
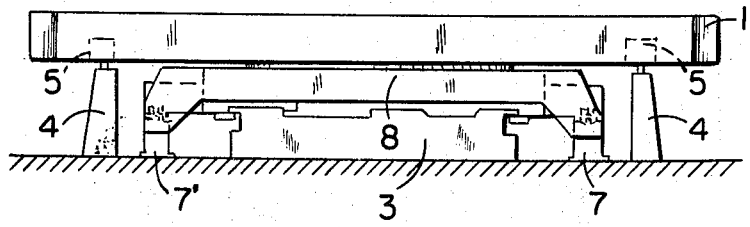
FIG.3
FIG.5
FIG.4

SUPPORTING DEVICE IN A ROTARY TABLE FOR A MACHINE TOOL

BACKGROUND OF THE INVENTION

The present invention relates to improvements in a supporting device in a rotary table, for supporting an article to be worked, which is to be used in combination with various machine tools.

Heretofore, a rotary table has been conventionally used for enabling the machining, by machine tools, of every surface except the bottom surface of an article to be worked through a single machining schedule, by fixedly securing the article to be worked on a table body and giving predetermined rotations and rectilinear feeds to the table body, so as to bring the article to be worked successively at the desired machining positions. In the above-described rotary table in the prior art, however, the table body, on which the article to be worked is fixedly secured, is apt to be subjected to flexure about a fulcrum at the edge portion of an annular sliding surface for the table body. In order to prevent such flexure of the table body, in some of the prior art rotary tables, separate support members were disposed on a foundation on the opposite sides of a bed member in parallel relation to the direction of rectilinear feed of the table body, and the opposite remote ends of the table body were supported on these separate support members by the intermediary of hydraulic jack means provided at the opposite ends of the table body, when the table body is placed transversely of the direction of rectilinear feed of the table body. The last-mentioned type of rotary tables in the prior art still had a disadvantage that although the separate support means are effective when the table body is placed transversely of the direction of rectilinear feed of the table body, they would become useless if the table body is turned by 90° about its rotational axis from the first-mentioned position, because, at the turned position of the table body, there is no supporting member to engage with the hydraulic jack means provided at the opposite ends of the table body.

SUMMARY OF THE INVENTION

An object of the present invention is to provide a novel structure of supporting device in a rotary table, which is free from the above-mentioned disadvantages.

According to the present invention, the last-mentioned type of supporting device in a rotary table is improved by the provision of bridge bed members disposed between the respective support members and the bed member in parallel to the support members, and a pair of table body supporting bridge members, having their respective leg portions slidably supported by the bridge bed members so as to be bridged over the bed member, and by constructing the pair of table body supporting bridge members so as to be movable together with the table body along the bridge bed members.

These and other features and advantages of the present invention will become apparent from perusal of the following description of its preferred embodiment taken in conjunction with the accompanying drawings.

BRIEF DESCRIPTION OF THE DRAWING

In the Drawings:

FIG. 3 is a plan view of a preferred embodiment of a rotary table in accordance with the invention;
FIG. 4 is a front view thereof;
FIG. 5 is a cross-sectional view taken along the line V—V of FIG. 3.

DESCRIPTION OF THE PREFERRED EMBODIMENT

Figure 1:
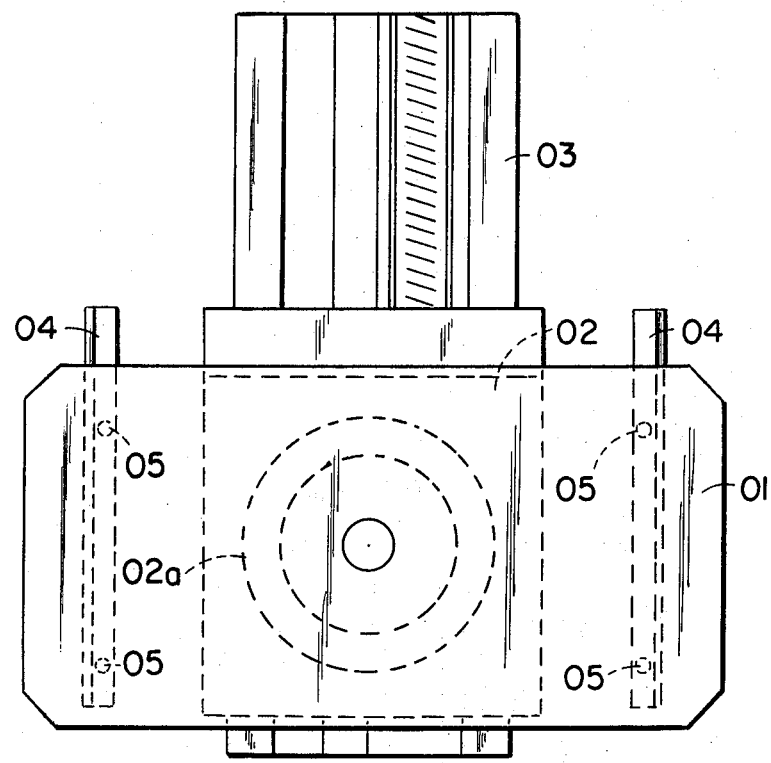
FIG. 1 is a plan view of a prior art rotary table.
Figure 2:
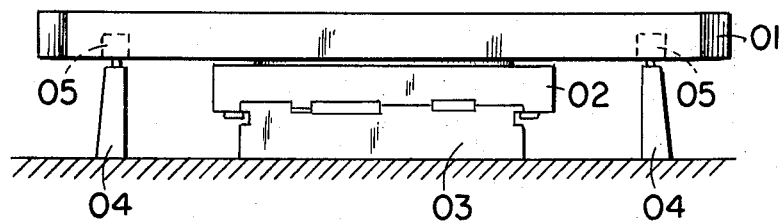
FIG. 2 is a front view of the same.
Figure 7:
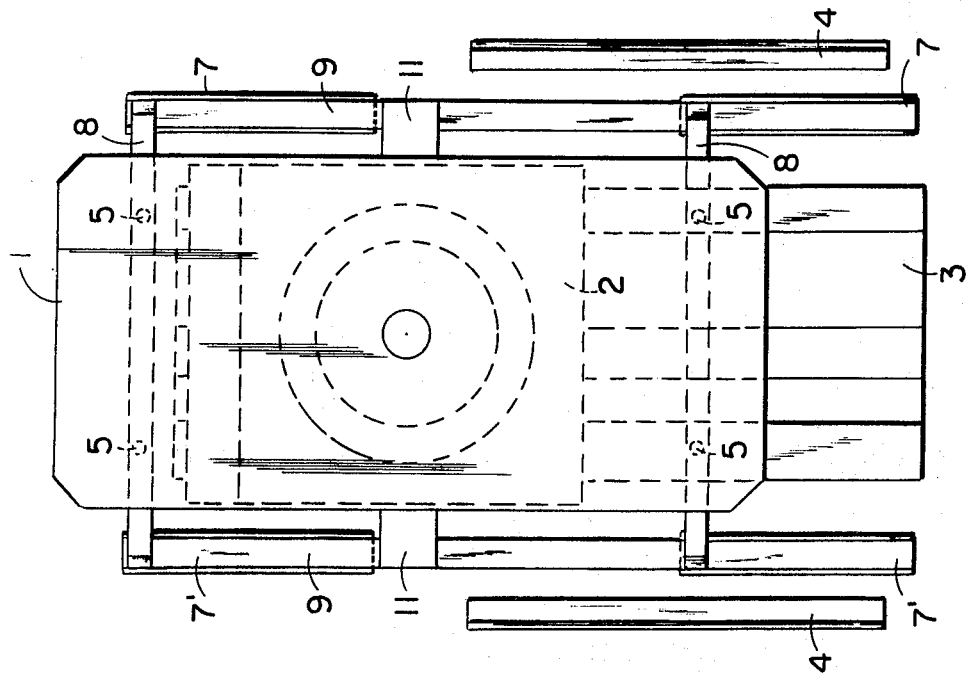
FIGS. 6 and 7 are plan views illustrating the table, during use, in two different angular positions.

At first, description will be made of a prior art rotary table for a machine tool with reference to FIGS. 1 and 2. In these figures, the rotary table consists of a table body 01, a base member 02 for rotatably supporting table body 01 via an annular sliding surface 02a, a bed member 03 for horizontally and slidably supporting and guiding base 02, driving means for rotating the table body 01, and another driving means for giving rectilinear feeds to the base 02 together with the table body 01 along the bed member 03 (neither of these driving means is shown). The rotary table enables the machining by machine tools of every surface except the bottom surface of an article to be worked, through a single machining schedule, by fixedly securing the article to be worked on the table body and giving predetermined rotations and rectilinear feeds to the table body, so as to bring the article to be worked successively at the desired machining positions. Then the condition of supporting the article is such that the weight of the article to be worked and the table body 01 is supported via the annular sliding surface 02a, and, under such a condition, there occurs flexure having a fulcrum at the edge portion of the annular sliding surface for the table body 01. The amount of flexure is varied in accordance with the weight of the article to be worked that is fixedly secured on the table body 01, the rigidity of the table body 01, the method for supporting the table body, etc., and if this amount of flexure is minimized, then the accuracy of support of the article to be worked is raised, and consequently, the accuracy in working of the article would be enhanced.

Therefore, in the prior art rotary table, two separate support members 04, 04 were disposed on the opposite sides of the bed member 03, that is, beneath and in proximity to the opposite ends of the table body 01, in parallel to the direction of rectilinear feed of the table body 01. On the other hand, on the lower surface of the table body 01 there are disposed a plurality of hydraulic jack means respectively in proximity to the opposite end portions. These separate support members 04, 04 and hydraulic jack means 05 form an auxiliary supporting device for the table body 01 constructed and arranged in such manner that, when hydraulic jack means 05 are actuated, the support shafts of the hydraulic jack means abut against the separate support members 04, 04 to support the opposite end portions of the table body 01. If the above-described supporting device is employed, the amount of flexure of the table body 01 is reduced because the number of support points for the table body is increased, so that the accuracy of support of the article to be worked by means of the table body 01 is raised, and consequently, the accuracy in working of the article is enhanced. However, in the case of the above-described prior art auxiliary supporting device the table body 01 can be supported on the support members 04, 04 via the hydraulic jack means 05, only when the opposite end portions of the table body 01 are located above the support members 04, 04. Therefore, such an auxiliary supporting device had a disadvantage that, if the table body 01 is turned by 90° from the position illustrated in FIGS. 1 and 2 about its rotational axis, then the supporting device would be of no use at all.

Now the present invention will be described in more detail with reference to the preferred embodiment illustrated in FIGS. 3 through 7. In these figures, a table body is represented at 1, a table base member at 2, an annular sliding surface portion between the table body 1 and the table base member 2 at 2a, a bed member at 3, two separate support members at 4, 4, and a plurality of hydraulic jack means at 5. The construction and arrangement of these members as well as their functions and advantages are the same as the corresponding members in the prior art rotary table illustrated in FIGS. 1 and 2. In addition, reference numerals 7, 7 and 7', 7' designate bridge bed members mounted on the foundation, about in the middle of the spaces between bed member 3 and the separate support members 4, 4 on the opposite sides of the bed member 3, in parallel to the support members, maintaining a predetermined interval therebetween, and these bridge bed members serve to support and guide the bridge members as described later. Reference numerals 8, 8 designate a pair of bridge members which can slide over bridge bed member 3 in the direction of rectilinear feed of the table body 1 with their respective leg ends supported and guided by bridge bed members 7, 7 and 7', 7'. Bridge members 8, 8 are bridged over the bed member 3 with upper surfaces aligned at the same level as the upper end surfaces of separate support members 4, 4, and disposed at a right angle to the direction of rectilinear feed of the table body 1, the end portions of the respective bridge members 8, 8 being connected by means of connecting rods 9, 9, respectively. The distance *l2* between the respective bridge members 8, 8 is selected equal to the distance *l1* between the respective support members 4, 4 (See FIG. 6). Reference numeral 10 designates clamp seats provided substantially at the center of the upper surfaces of respective connecting rods 9, 9, and reference numeral 11 designates brackets projecting from about the middle portions of the opposite side faces of the table base member 2. Reference numeral 12 designates hydraulic clamp means interposed between each bracket 11 and the associated clamp seat 10, which are adapted to clamp said clamp seat 10 so as to integrally connect the bracket 11 and the connected rod 9 when hydraulic clamp means 12 are actuated by means of a hydraulic pressure source, not shown. In other words, the above-mentioned members are constructed and arranged in such manner that by actuating the hydraulic clamp means 12, the bridge members 8, 8 may be ganged with the rectilinear feed motion of the table body 1 by the intermediary of the connecting rods 9, the brackets 11 and the table base member 2.

Figure 6:
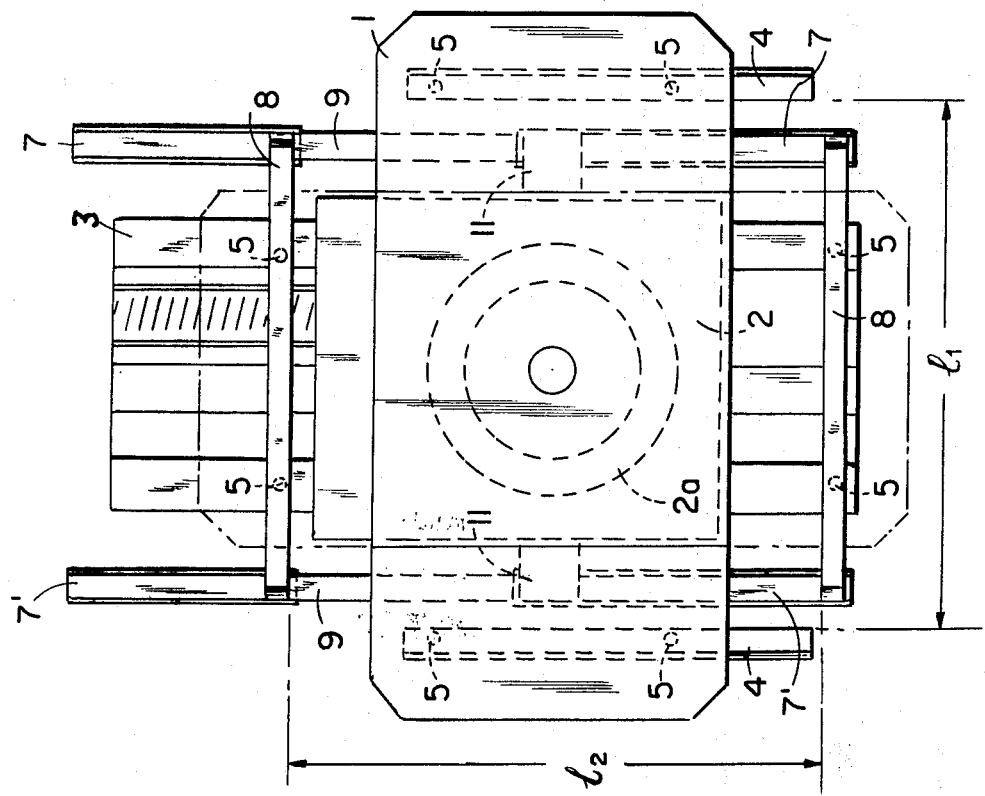

The table supporting device according to the present invention is constructed as described above, so that similarly to the case of the prior art table supporting device, if the table body 1 is positioned as shown by the solid line in FIG. 6, where the opposite end portions are located above the support members 4, 4, then the table body 1 can be supported by the support members 4, 4 via the support shafts of the plurality of hydraulic jack means 5 provided on the lower surface of the table body 1. Now considering the case as illustrated by the double-dot chain line in FIG. 6 where the table body 1 has been turned by 90° from the position represented by the solid line, at the opposite end portions of the table body 1, the support shafts of the hydraulic jack means 5 project downwardly and abut against the upper surfaces of the bridge members 8, 8, whereby the table body 1 may be supported by the bridge bed members 7, 7 and 7', 7' via bridge members 8, 8. In this case, it is a matter of course that the table body 1 is also supported through the annular sliding surface portion 2a. In order to give a rectilinear feed to the table body 1 while maintaining the above-described supporting condition of the table body 1 for locating the table body 1 at the position illustrated in FIG. 7, the hydraulic clamp means 12 are actuated to integrally connect the table base member 2 and the bridge members 8, 8 via the brackets 11 and the connecting rods 9, and then the desired rectilinear feed is given to the table base member 2. Then the bridge members 8, 8 slide along the bridge bed members 7, 7 and 7', 7' together with the table base member 2 while supporting the table body 1 thereon, and thereby locate the table body 1 at the desired position.

Since the supporting device according to the present invention is constructed and functions as described above, it enables the support of table body 1 even after rotation by 90° of the table body 1 which action is normally required for such kinds of rotary tables. Therefore, the present invention has an advantage that it raises the accuracy of support of the table body 1 for the article to be worked and consequently it is useful for enhancing the working accuracy of the machine tools.

What is claimed is:

1. In a supporting device in a rotary table, for a machine tool, of the type including support members on a foundation adjacent the opposite sides of a table bed member, along which the table body is linearly displaceable, the support members extending parallel to the direction of displacement for supporting the ends of the table body when the latter extends transversely of the table bed member, through the medium of jack means adjacent the opposite ends of the table body, the improvement comprising, in combination, bridge bed members on the foundation between each support member and said table bed member, and extending parallel to said support members; and a pair of longitudinally spaced table body supporting bridge members extending in bridging relation across said table bed member and each having a pair of leg portions slidably supported by a pair of said laterally spaced bridge bed members; said bridge members supporting the ends of the table body when the latter is oriented substantially longitudinally of said table bed member.

2. In a supporting device in a rotary table, the improvement claimed in claim 1, including means interconnecting said bridge members for conjoint displacement along said bridge bed members.

3. In a supporting device in a rotary table, the improvement claimed in claim 2, including means selectively operable to interconnect said bridge members and said table body for conjoint movement longitudinally of said bed member.

4. In a supporting device in a rotary table, the improvement claimed in claim 1, in which the upper surfaces of said bridge members are in substantially the same horizontal plane as the upper surfaces of said support members, for cooperation with said jack means.

* * * * *